US012701587B2

(12) United States Patent
Matsumura et al.

(10) Patent No.: US 12,701,587 B2
(45) Date of Patent: Aug. 4, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 322 days.

(21) Appl. No.: 18/561,532

(22) PCT Filed: Mar. 29, 2022

(86) PCT No.: PCT/JP2022/015539
§ 371 (c)(1),
(2) Date: Nov. 16, 2023

(87) PCT Pub. No.: WO2022/244493
PCT Pub. Date: Nov. 24, 2022

(65) Prior Publication Data
US 2024/0267934 A1 Aug. 8, 2024

(30) Foreign Application Priority Data

May 21, 2021 (JP) ................................. 2021-086492

(51) Int. Cl.
*H04W 72/232* (2023.01)
*H04L 5/00* (2006.01)
(52) U.S. Cl.
CPC ......... *H04W 72/232* (2023.01); *H04L 5/0048* (2013.01)

(58) Field of Classification Search
CPC ........................... H04W 72/232; H04L 5/0048
See application file for complete search history.

(56) References Cited

U.S. PATENT DOCUMENTS

2021/0392671 A1* 12/2021 Liu ................... H04W 72/1263
2023/0209567 A1* 6/2023 Grossmann ........... H04L 5/0051
370/329

(Continued)

FOREIGN PATENT DOCUMENTS

WO 2020/093362 A1 5/2020

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

(Continued)

*Primary Examiner* — Won Tae C Kim
(74) *Attorney, Agent, or Firm* — Osha Bergman Watanabe & Burton LLP

(57) ABSTRACT

Appropriately performing STRP/MTRP PUSCH transmission. A terminal according to one aspect of the present disclosure includes a receiving section that receives downlink control information including a first sounding reference signal (SRS) resource indicator (SRI) field and a second SRI field, and a control section that performs control to perform non-codebook-based uplink transmission scheduled by the downlink control information by using a first panel determined on the basis of the first SRI field and a second panel determined on the basis of the second SRI field.

9 Claims, 13 Drawing Sheets

(56) References Cited

U.S. PATENT DOCUMENTS

| | | | | |
|---|---|---|---|---|
| 2023/0344576 A1* | 10/2023 | Lim | ..................... | H04L 5/0044 |
| 2024/0214947 A1* | 6/2024 | Park | ..................... | H04L 5/0053 |

OTHER PUBLICATIONS

International Search Report issued in corresponding International Application No. PCT/JP2022/015539, mailed on May 17, 2022 (5 pages).

Written Opinion issued in corresponding International Application No. PCT/JP2022/015539, mailed on May 17, 2022 (3 pages).

NTT Docomo, Inc.; "Discussion on MTRP for reliability"; 3GPP TSG RAN WG1 #104-e, R1-2101598; e-Meeting; Jan. 25-Feb. 5, 2021 (16 pages).

Office Action issued in counterpart Japanese Patent Application No. 2023-522301 mailed on Jan. 20, 2026 (11 pages).

InterDigital Inc.; "Views on PDCCH, PUCCH, and PUSCH Enhancements for M-TRP"; 3GPP TSG RAN WG1 #104b-e, R1-2102433; e-Meeting; Apr. 12-20, 2021 (9 pages).

Asia Pacific Telecom; "Discussion on enhancements on multi-TRP for uplink channels"; 3GPP TSG-RAN WG1 #102-e, R1-2006637; e-Meeting; Aug. 17-28, 2020 (3 pages).

* cited by examiner

| SRI FIELD VALUE | SRS RESOURCE |
|---|---|
| 0 | FIRST SRS RESOURCE IN FIRST SRS RESOURCE SET |
| 1 | SECOND SRS RESOURCE IN FIRST SRS RESOURCE SET |
| 2 | FIRST SRS RESOURCE IN SECOND SRS RESOURCE SET |
| 3 | SECOND SRS RESOURCE IN SECOND SRS RESOURCE SET |

FIG. 2

| SRS RESOURCE SET INDICATOR FIELD VALUE | SRS RESOURCE SET |
|---|---|
| 0 | FIRST SRS RESOURCE SET |
| 1 | SECOND SRS RESOURCE SET |

| SRI FIELD VALUE | SRS RESOURCE |
| --- | --- |
| 0 | SRI #0 IN FIRST SRS RESOURCE SET |
| 1 | SRI #1 IN FIRST SRS RESOURCE SET |
| 2 | SRI #{0, 1} IN FIRST SRS RESOURCE SET |
| 3 | SRI #0 IN SECOND SRS RESOURCE SET |
| 4 | SRI #1 IN SECOND SRS RESOURCE SET |
| 5 | SRI #2 IN SECOND SRS RESOURCE SET |
| 6 | SRI #3 IN SECOND SRS RESOURCE SET |
| 7 | SRI #{0, 1} IN SECOND SRS RESOURCE SET |
| ... | ... |

FIG. 9

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), one or a plurality of transmission/reception points (TRPs) (multiple TRPs (Multi TRP (MTRP))) that perform DL transmission to a user terminal (User Equipment (UE)) are under study. The UE that performs UL transmission to one or the plurality of TRPs by using one or a plurality of panels is under study.

For future radio systems (for example, Rel. 17 (or later versions) NR), repetition transmission of a Physical Uplink Shared Channel (PUSCH) with MTRP is under study.

However, a study of how to perform control/configuration for a UE having a plurality of panels in relation to a single TRP (STRP)/MTRP PUSCH has not yet been advanced. Unless these are appropriately defined, communication throughput, communication quality, and the like may deteriorate.

Thus, an object of the present disclosure is to provide a terminal, a radio communication method, and a base station that can appropriately perform STRP/MTRP PUSCH transmission.

Solution to Problem

A terminal according to one aspect of the present disclosure includes a receiving section that receives downlink control information including a first sounding reference signal (SRS) resource indicator (SRI) field and a second SRI field, and a control section that performs control to perform non-codebook-based uplink transmission scheduled by the downlink control information by using a first panel determined on the basis of the first SRI field and a second panel determined on the basis of the second SRI field.

Advantageous Effects of Invention

According to one aspect of the present disclosure, it is possible to appropriately perform STRP/MTRP PUSCH transmission.

BRIEF DESCRIPTION OF DRAWINGS

FIG. 2 is a diagram to show an example of correspondence between an SRI field value, and an SRS resource set and SRS resource in embodiment 1.1.1.

FIG. 3 is a diagram to show an example of correspondence between an SRSI field value and an SRS resource set in embodiment 1.1.2.

FIG. 8 is a diagram to show an example of SRS resource sets configured in a third embodiment.

FIG. 9 is a diagram to show an example of correspondence between an SRI field value, and an SRS resource set and SRS resource in embodiment 3.1.1.

Figure 1:
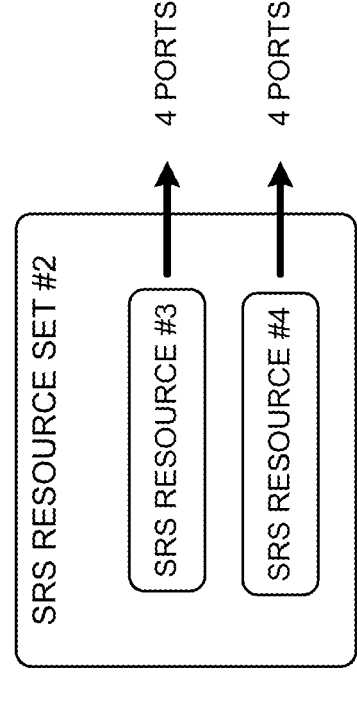
FIG. 1 is a diagram to show an example of SRS resource sets configured in a first embodiment.
Figure 1:
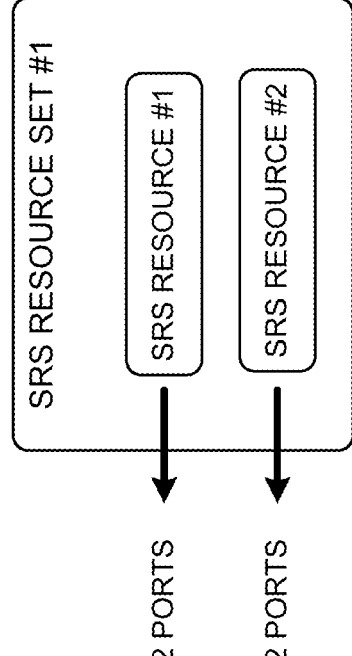

DESCRIPTION OF EMBODIMENTS (Spatial Relation for SRS and PUSCH)

In Rel-15/16 NR, a UE may receive information (SRS configuration information, for example, a parameter in an RRC control element "SRS-Config") used for transmission of a measurement reference signal (for example, a sounding reference signal (SRS)).

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be related to a certain number of (for example, one or more or a plurality of) SRS resources (may group the certain number of SRS resources together). Each SRS resource may be identified by an SRS resource indicator (SRI) or an SRS resource ID (Identifier).

The SRS resource set information may include an SRS resource set ID (SRS-ResourceSetId), a list of SRS resource IDs (SRS-ResourceId) used in the resource set, an SRS resource type (for example, any one of a periodic SRS, a semi-persistent SRS, and aperiodic CSI (Aperiodic SRS)), and information about SRS usage.

Here, the SRS resource type may indicate any one of a periodic SRS (P-SRS), a semi-persistent SRS (SP-SRS), and aperiodic CSI (Aperiodic SRS (A-SRS)). Note that the UE may periodically (or, after activation, periodically) transmit the P-SRS and the SP-SRS, and may transmit the A-SRS on the basis of an SRS request from DCI.

The usage (an RRC parameter "usage," an L1 (Layer-1) parameter "SRS-SetUse") may be, for example, beam management (beamManagement), codebook (CB), non-codebook (noncodebook (NCB)), antenna switching, or the like. An SRS for codebook (CB) or non-codebook (NCB) usage may be used for determination of a precoder for codebook-based or non-codebook-based PUSCH transmission based on the SRI.

For example, in a case of the codebook-based transmission, the UE may determine the precoder for the PUSCH transmission on the basis of an SRI, a transmitted rank indicator (TRI), and a transmitted precoding matrix indicator (TPMI). In a case of the non-codebook-based transmission, the UE may determine the precoder for the PUSCH transmission on the basis of an SRI.

The SRS resource information may include an SRS resource ID (SRS-ResourceId), the number of SRS ports, an SRS port number, a transmission Comb, SRS resource mapping (for example, a time and/or frequency resource location, resource offset, a resource periodicity, the number of repetitions, the number of SRS symbols, an SRS bandwidth, or the like), hopping-related information, an SRS resource type, a sequence ID, SRS spatial relation information, and the like.

The SRS spatial relation information (for example, an RRC information element "spatialRelationInfo") may indicate information about a spatial relation between a certain reference signal and an SRS. The certain reference signal may be at least one of a synchronization signal/broadcast channel (Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The SRS spatial relation information may include, as an index of the above-described certain reference signal, at least one of an SSB index, a CSI-RS resource ID, and an SRS resource ID.

Note that in the present disclosure, an SSB index, an SSB resource ID, and an SSB Resource Indicator (SSBRI) may be interchangeably interpreted. A CSI-RS index, a CSI-RS resource ID, and a CSI-RS Resource Indicator (CRI) may be interchangeably interpreted. An SRS index, an SRS resource ID, and an SRI may be interchangeably interpreted.

The SRS spatial relation information may include a serving cell index, a BWP index (BWP ID), and the like corresponding to the above-described certain reference signal.

With respect to a certain SRS resource, when spatial relation information related to an SSB or CSI-RS and an SRS is configured, the UE may transmit the SRS resource by using the same spatial domain filter (spatial domain transmission filter) as a spatial domain filter (spatial domain reception filter) for reception of the SSB or CSI-RS. In this case, the UE may assume that a UE receive beam of the SSB or CSI-RS and a UE transmit beam of the SRS are the same.

With respect to a certain SRS (target SRS) resource, when spatial relation information related to another SRS (reference SRS) and the SRS (target SRS) is configured, the UE may transmit the target SRS resource by using the same spatial domain filter (spatial domain transmission filter) as a spatial domain filter (spatial domain transmission filter) for transmission of the reference SRS. That is, in this case, the UE may assume that a UE transmit beam of the reference SRS and a UE transmit beam of the target SRS are the same.

The UE may determine, on the basis of a value of a certain field (for example, an SRS resource indicator (SRI) field) in DCI (for example, DCI format 0_1), a spatial relation for a PUSCH scheduled by the DCI. Specifically, the UE may use, for PUSCH transmission, spatial relation information (for example, an RRC information element "spatialRelation-Info") about an SRS resource determined on the basis of the value of the certain field (for example, the SRI).

When codebook-based PUSCH transmission is used in Rel-16 NR, for the UE, one SRS resource set with usage=CB may be configured, two SRS resources for the SRS resource set may be configured by RRC, and one of the two SRS resources may be indicated by DCI (for example, a 1-bit SRI field). Note that in a case other than a case where full power mode 2 is configured (for example, a higher layer parameter ul-FullPowerTransmission-r16 is configured to fullpower-Mode2), SRS resources of the same SRS resource set may have the same number of ports (number of SRS ports).

When non-codebook-based PUSCH transmission is used in Rel-16 NR, for the UE, one SRS resource set with usage=NCB may be configured, four SRS resources for the SRS resource set may be configured by RRC, and one or combination of the four SRS resources may be indicated by DCI (for example, a 2-bit SRI field). Note that the SRS resources of the SRS resource set with usage=NCB may each have 1 port.

(Multiple TRPs)

For NR, one or a plurality of transmission/reception points (TRPs) (multiple TRPs (Multi-TRP (M-TRP))) that perform DL transmission to a UE by using one or a plurality of panels (multiple panels) are under study. Also, the UE that performs UL transmission to one or the plurality of TRPs by using one or a plurality of panels is under study.

Incidentally, for future radio systems (for example, Rel. 17 (or later versions) NR), a case that a plurality of (for example, two) SRS resource indicators (SRIs)/transmitted precoding matrix indicators (TPMIs) are indicated by using single DCI for performing PUSCH repetition transmission PUSCH transmission with multiple TRPs (MTRP PUSCH repetition) is under study.

For example, in a case of the codebook-based transmission, the UE may determine a precoder for the PUSCH transmission on the basis of an SRI, a transmitted rank indicator (TRI), and a TPMI. In a case of the non-codebook-based transmission, the UE may determine the precoder for the PUSCH transmission on the basis of an SRI. Note that the SRI may be specified for the UE by DCI, or may be given by a higher layer parameter.

When the single DCI indicates the plurality of SRIs/TPMIs, option 1 or option 2 below is conceivable;

Option 1: SRIs/TPMIs (values) for a plurality of (for example, two) TRPs are indicated by using a plurality of (for example, two) fields to indicate SRIs/TPMIs, and Option 2: one field to indicate SRIs/TPMIs is indicated, and a codepoint corresponding to a plurality of (for example, two) SRI/TPMI values is configured for the field to indicate the SRIs/TPMIs.

In option 1, a codepoint of each of the plurality of SRI/TPMI fields may correspond to one TPMI value. Correspondence (association) between the SRI/TPMI fields and the SRI/TPMI values may be defined in specifications beforehand. The correspondence (association) between the SRI/TPMI fields and the SRI/TPMI values may use correspondence defined in Rel. 16 (or earlier versions), or may be correspondence defined in Rel. 17 (or later versions). The correspondence between the SRI/TPMI fields and the SRI/TPMI values may vary for each of the plurality of SRI/TPMI fields.

In option 2, a codepoint for which the one SRI/TPMI field is indicated may correspond to a plurality of (for example, two) SRI/TPMI values. Correspondence (association) between the SRI/TPMI field and the SRI/TPMI values may be defined in specifications beforehand, or may be notified/configured/activated by RRC signaling/MAC CE.

Note that a case that single PUSCH transmission/PUSCH repetition transmission using a single TRP (STRP) and PUSCH repetition transmission using multiple TRPs (Multi TRP (MTRP)) are dynamically indicated/switched by DCI is under study. For the dynamic switch, a specific field included in DCI defined in Rel. 16 (or earlier versions) may be used, or a specific field defined in Rel. 17 (or later versions) (for example, a field for specifying STRP or MTRP operation) may be used.

The "dynamic switch" in the present disclosure may mean a "switch using at least one of higher layer signaling and physical layer signaling." The "switch" of the present disclosure and each of switching, change, changing, application, indication, configuration, and the like may be interchangeably interpreted.

Note that in the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

Incidentally, for a case where the above-mentioned single DCI indicates the plurality of SRIs/TPMIs, a case that the numbers of SRS ports for the two TRPs are equalized is under study. A case that when the UE has a plurality of panels, PUSCH beam indication is controlled for each panel is also under study.

However, with respect to an STRP/MTRP PUSCH, a study of how to notify SRIs and how to perform SRS resource set configuration for the UE having the plurality of panels has not yet been advanced. Unless these are appropriately defined, communication throughput, communication quality, and the like may deteriorate.

Thus, the inventors of the present invention came up with the idea of a method for appropriately performing SRI indication and SRS resource set configuration for the STRP/MTRP PUSCH.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted.

In the present disclosure, activate, deactivate, indicate (or specify), select, configure, update, determine, and the like may be interchangeably interpreted.

In the present disclosure, RRC, an RRC parameter, an RRC message, RRC signaling, a higher layer parameter, an information element (IE), and configuration may be interchangeably interpreted. In the present disclosure, a MAC CE, an update command, and an activation/deactivation command may be interchangeably interpreted. In the present disclosure, support, control, controllable, operate, and operable may be interchangeably interpreted.

In the present disclosure, a panel, a UE panel, a beam, a panel group, a beam group, a precoder, an Uplink (UL) transmission entity, a TRP, spatial relation information (SRI), a spatial relation, an SRS resource indicator (SRI), an SRS resource, a control resource set (COntrol REsource SET (CORESET)), a Physical Downlink Shared Channel (PDSCH), a codeword, a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), a certain resource (for example, a certain reference signal resource), a certain resource set (for example, a certain reference signal resource set), a CORESET pool, a PUCCH group (PUCCH resource group), a spatial relation group, a downlink TCI state (DL TCI state), an uplink TCI state (UL TCI state), a unified TCI state, a common TCI state, QCL, QCL assumption, and the like may be interchangeably interpreted.

A TCI state Identifier (ID) and a TCI state may be interchangeably interpreted. The TCI state and a TCI may be interchangeably interpreted.

In the present disclosure, an index, an ID, an indicator, and a resource ID may be interchangeably interpreted. In the present disclosure, a sequence, a list, a set, a group, a cluster, a subset, and the like may be interchangeably interpreted.

In the present disclosure, a TRP index, a CORESET pool index (CORESETPoolIndex), a pool index, a group index, and the like may be interchangeably interpreted.

In the present disclosure, a list, a group, a cluster, a subset, and the like may be interchangeably interpreted. In the present disclosure, spatial relation information (SRI), an SRS resource indicator (SRI) (or SRI field), an SRS resource, an SRS resource set, a precoder, and the like may be interchangeably interpreted.

In the present disclosure, the spatial relation information (SRI), a combination of SRIs, SRI for codebook-based transmission, a combination of non-codebook-based SRIs, spatialRelationInfo, a UL TCI, a TCI state, a Unified TCI, QCL, and the like may be interchangeably interpreted.

In the present disclosure, a first TRP and second TRP and each of a first PUSCH and second PUSCH, a first PUSCH transmission occasion and second PUSCH transmission occasion, a first SRI and second SRI, and the like may be interchangeably interpreted.

In the present disclosure, the first TRP (for example, TRP #1) and the second TRP (for example, TRP #2) may correspond to a first spatial relation (for example, $1^{st}$ spatial relation)/beam/UL TCI/QCL and a second spatial relation/beam/UL TCI/QCL, respectively. Alternatively, the first TRP (for example, TRP #1) and the second TRP (for example, TRP #2) may correspond to a spatial relation/beam/UL TCI/QCL associated with a first SRI field or a first TPMI field and a spatial relation/beam/UL TCI/QCL associated with a second SRI field or a second TPMI field, respectively. Alternatively, the first TRP (for example, TRP #1) and the second TRP (for example, TRP #2) may correspond to a first SRS resource set with usage being CB/NCB (for example, usage=CB/NCB) and a second SRS resource set with usage being CB/NCB (for example, usage=CB/NCB), respectively.

In the present disclosure, with respect to single DCI, an i-th TRP (TRP #i) may mean an i-th TCI state, an i-th CDM group, and the like (i is an integer). With respect to multiple DCI, an i-th TRP (TRP #i) may mean a CORESET corresponding to CORESET pool index=i, an i-th TCI state, an i-th CDM group, and the like (i is an integer).

Note that in PUSCH repetition, the same codeword/transport block may be communicated in respective PUSCHs (respective repetitions). The PUSCH repetition and a plurality of PUSCHs having the same content (for example, data/codeword/transport block) may be interchangeably interpreted.

MTRP PUSCH repetition in the present disclosure and each of two PUCCH repetitions for two TRPs, two PUSCH repetitions using two SRIs, two PUSCH repetitions using two power control parameter sets (power control parameter will be mentioned below), and the like may be interchangeably interpreted.

In the present disclosure, STRP PUSCH repetition may mean repetition transmission of a plurality of PUSCHs transmitted by using one (same) SRI/power control parameter set/beam/precoder. Note that single transmission may mean PUSCH transmission transmitted by using one SRI/power control parameter set/beam/precoder. An STRP PUSCH of the present disclosure may mean the STRP PUSCH repetition and the single transmission.

Note that PUSCH repetition/PUSCH transmission for TRP 1 may mean PUSCH repetition/PUSCH transmission using a first SRI (or SRI field)/first power control parameter set.

PUSCH repetition/PUSCH transmission for TRP 2 may mean PUSCH repetition/PUSCH transmission using a second SRI (or SRI field)/second power control parameter set.

Note that in the present disclosure, the power control parameter may be at least one of $P_{CMAX,f,c}$, Maximum Power Reduction (MPR), power management maximum power reduction (P-MPR), additional maximum power reduction (Additional MPR (A-MPR)), $\Delta Tc$, $P_0$, alpha, a pathloss reference signal (PL-RS), and a closed-loop index (1).

PUSCH repetition transmission for a plurality of TRPs in embodiments below and each of a PUSCH across the plurality of TRPs, PUSCH repetition across the plurality of TRPs, just PUSCH repetition, repetition transmission, a plurality of PUSCH transmissions, and the like may be interchangeably interpreted. A single PUSCH transmission for a single TRP may be referred to as just single PUSCH transmission, PUSCH transmission in the single TRP, or the like.

In the present disclosure, repetition transmission of a PUSCH for a single TRP may mean repetition transmission of a plurality of PUSCHs transmitted by using the same SRI/beam/precoder.

In the present disclosure, repetition transmission of a PUSCH for multiple TRPs may mean repetition transmission of a plurality of PUSCHs transmitted by using a plurality of different SRIs/beams/precoders. As described in the above-described mapping pattern, the repetition transmission and the plurality of SRIs/beams/precoders may cyclically correspond to each other, may sequentially correspond to each other for respective specific numbers of repetition transmissions, or may be correspondence using the half-half pattern (mapping).

Respective embodiments in the present disclosure will be described by using, as a main example, a case where the numbers of multiple TRPs, multiple SRIs, and the like are two, but the numbers of these may be 3 or more. The "dynamic switch" in the present disclosure may mean a "switch using at least one of higher layer signaling and physical layer signaling." The "switch" of the present disclosure and each of switching, change, changing, application, and the like may be interchangeably interpreted.

Note that the respective embodiments in the present disclosure will be described by using, as an example, PUSCH transmission for a single TRP/plurality of TRPs using one piece of DCI as UL transmission, but PUSCH transmission to which the respective embodiments can be applied is not limited to these.

The respective embodiments of the present disclosure can also be employed in repetition transmission of an arbitrary UL signal/channel for multiple TRPs as appropriate, and a PUSCH of the present disclosure may be interpreted as the arbitrary UL signal/channel. For example, the respective embodiments of the present disclosure can also be employed in repetition transmission of a PUCCH for multiple TRPs as appropriate, and the PUSCH of the present disclosure may be interpreted as the PUCCH.

The respective embodiments in the present disclosure will be described by using, as a main example, a case where the numbers of multiple TRPs, multiple SRIs, and the like are two, but the numbers of these may be 3 or more. In other words, "two" of the present disclosure may be interpreted as a "plurality."

An SRS resource set in the embodiments below may be interpreted as an SRS resource set with usage being codebook or non-codebook, or may be interpreted as an SRS resource set for other usage. For example, an SRS resource set in an embodiment based on an assumption of a CB-based PUSCH may be interpreted as an SRS resource set with usage being codebook, or may be interpreted as an SRS resource set for other usage. An SRS resource set in an embodiment based on an assumption of an NCB-based PUSCH may be interpreted as an SRS resource set with usage being non-codebook, or may be interpreted as an SRS resource set for other usage.

In the present disclosure, an i-th SRS resource/SRS resource set (i is an integer) may be interpreted as an SRS resource/SRS resource set with the i-th lowest (or highest) ID (for example, SRS resource ID, SRS resource set ID, or entry index). An i-th SRS resource/SRS resource set (i is an integer) may mean an SRS resource/SRS resource set with the i-th lowest (or highest) ID (for example, SRS resource ID, SRS resource set ID, or entry index), out of active SRS resources/SRS resource sets.

A "UE" in the embodiments below may be interpreted as at least one of a UE having a plurality of panels, a UE to support operation of a plurality of panels, and a UE for which operation of a plurality of panels is configured, or may be interpreted as a UE other than that (for example, a UE for which operation of a plurality of panels is not configured, or a UE for which full power mode 2 is configured (for example, a higher layer parameter ul-Full-PowerTransmission-r16 is configured to fullpowerMode2)).

"DCI" in the embodiments below may mean DCI for scheduling UL transmission (for example, a PUSCH) (for example, DCI format 0_0/0_1/0_2), or may mean another DCI format.

(Radio Communication Method)

First Embodiment

A first embodiment relates to SRI indication based on an assumption of a CB-based PUSCH.

In the first embodiment, at least two SRS resource sets are configured for a UE. SRS resources included in the same SRS resource set have the same number of ports. SRS resources included in different SRS resource sets may have different numbers of ports, or may have the same number of ports.

FIG. 1 is a diagram to show an example of the SRS resource sets configured in the first embodiment. In the present example, two SRS resource sets (SRS resource set #1, SRS resource set #2) are configured for the UE. SRS resource set #1 includes two SRS resources (SRS resource #1, SRS resource #2) with the number of ports=2, and SRS resource set #2 includes two SRS resources (SRS resource #3, SRS resource #4) with the number of ports=4.

The first embodiment is broadly classified into embodiment 1.1 regarding an STRP PUSCH and embodiment 1.2 regarding an MTRP PUSCH.

Embodiment 1.1

In embodiment 1.1, as a method with which the UE identifies which SRS resource of which SRS resource set is used for STRP PUSCH transmission, any one or combinations of embodiment 1.1.1 to embodiment 1.1.5 may be used.

Note that in embodiment 1.1, it may be assumed that one SRS resource set corresponds to one panel. The UE may perform transmission of a PUSCH (PUSCH repetition, PUSCH transmission occasion) using a certain SRS resource set by using a panel determined on the basis of the SRS resource set.

Embodiment 1.1.1

In embodiment 1.1.1, the UE determines both an SRS resource set and SRS resource on the basis of one SRI field.

FIG. 2 is a diagram to show an example of correspondence between an SRI field value, and an SRS resource set and SRS resource in embodiment 1.1.1. In the present disclosure, a field value, a field, a codepoint, and the like may be interchangeably interpreted.

In the present example, SRI codepoints 0 to x (x is an integer, x=1 in FIG. 2) correspond to first to (x+1)-th SRS resources in a first SRS resource set, respectively. SRI codepoints x+1 to x+1+y (y is an integer, y=1 in FIG. 2) correspond to first to (y+1)-th SRS resources in a second SRS resource set, respectively.

It may be assumed that a size of the SRI field of embodiment 1.1.1 is determined on the basis of a total number of SRS resources of all SRS resource sets for specific usage (for example, usage being codebook) configured for the UE.

Embodiment 1.1.2

In embodiment 1.1.2, the UE may identify an SRS resource set on the basis of an SRS resource set indicator (or indication) (SRSI) field newly included in DCI, and may determine an SRS resource in the SRS resource set on the basis of the SRI field.

FIG. 3 is a diagram to show an example of correspondence between an SRSI field value and an SRS resource set in embodiment 1.1.2. In the present example, SRSI codepoint 0 indicates a first SRS resource set, and SRSI codepoint 1 indicates a second SRS resource set.

It may be assumed that a size of the SRI field of embodiment 1.1.2 is determined on the basis of a total number of SRS resource sets for specific usage (for example, usage being codebook) configured for the UE. It may be assumed that the size of the SRI field is determined on the basis of a maximum number of SRS resources in one SRS resource set out of SRS resource sets for the above-described specific usage. For example, when the first SRS resource set has two SRS resources, and the second SRS resource set has one SRS resource, the size of the SRI field of embodiment 1.1.2 may be represented by 1 bit (capable of specifying two SRS resources).

Note that the SRSI field may be represented by an existing DCI field defined in Rel-15/16 NR, instead of by a new field.

Embodiment 1.1.3

In embodiment 1.1.3, an SRS resource set used for the STRP PUSCH may be specified (or activated) out of one or more SRS resource sets for the UE by a MAC CE. The UE may determine an SRS resource in the specified (or activated) SRS resource set on the basis of the SRI field.

This MAC CE may be a new MAC CE for specifying the SRS resource set for the STRP PUSCH, or may be an existing MAC CE defined in Rel-15/16 NR. For example, a field (for example, a field that has been a reserved field so far) for at least one of an SP SRS activation/deactivation MAC CE, an enhanced SP/AP SPS spatial relation indica- tion MAC CE (Enhanced SP/AP SRS Spatial Relation Indication MAC CE), an SRS pathloss reference RS update MAC CE, a serving cell set-based SRS spatial relation indication MAC CE, and the like out of existing MAC CEs may be used as a field indicating that an SRS resource set specified by the MAC CE is used/unused for the STRP PUSCH.

The MAC CE of embodiment 1.1.3 may be used for specifying an SRS resource set corresponding to the SRSI field of embodiment 1.1.2, or may be used for further limiting an SRS resource set of embodiment 1.1.4 men- tioned below.

Embodiment 1.1.4

In embodiment 1.1.4, an SRS resource set used for the STRP PUSCH may be specified (or configured) out of one or more SRS resource sets for the UE by an RRC parameter. The UE may determine an SRS resource in the specified (or configured) SRS resource set on the basis of the SRI field.

Embodiment 1.1.5

In embodiment 1.1.5, the UE may determine an SRS resource set used for the STRP PUSCH to perform reporting to a network (for example, a base station), and may deter- mine, on the basis of the SRI field, an SRS resource in the reported SRS resource set.

In embodiment 1.1.5, the SRS resource set used for the STRP PUSCH may be determined by the UE on the basis of at least one of arbitrary higher layer signaling (for example, RRC signaling or a MAC CE), physical layer signaling (for example, DCI), an RS, a result of RS measurement, a UE capability, and the like.

The UE may report information about the SRS resource set used for the STRP PUSCH (for example, an index of the SRS resource set) by using, for example, a MAC CE, UCI, an RS, or a combination of these.

Embodiment 1.2

In embodiment 1.2, the UE determines an SRS resource set/SRS resource for the MTRP PUSCH on the basis of two SRI fields.

Note that in embodiment 1.2, it may be assumed that one SRS resource set corresponds to one panel. The UE may perform transmission of a PUSCH (PUSCH repetition, PUSCH transmission occasion) using a certain SRS resource set by using a panel determined on the basis of the SRS resource set.

Figures 4A, 4B:
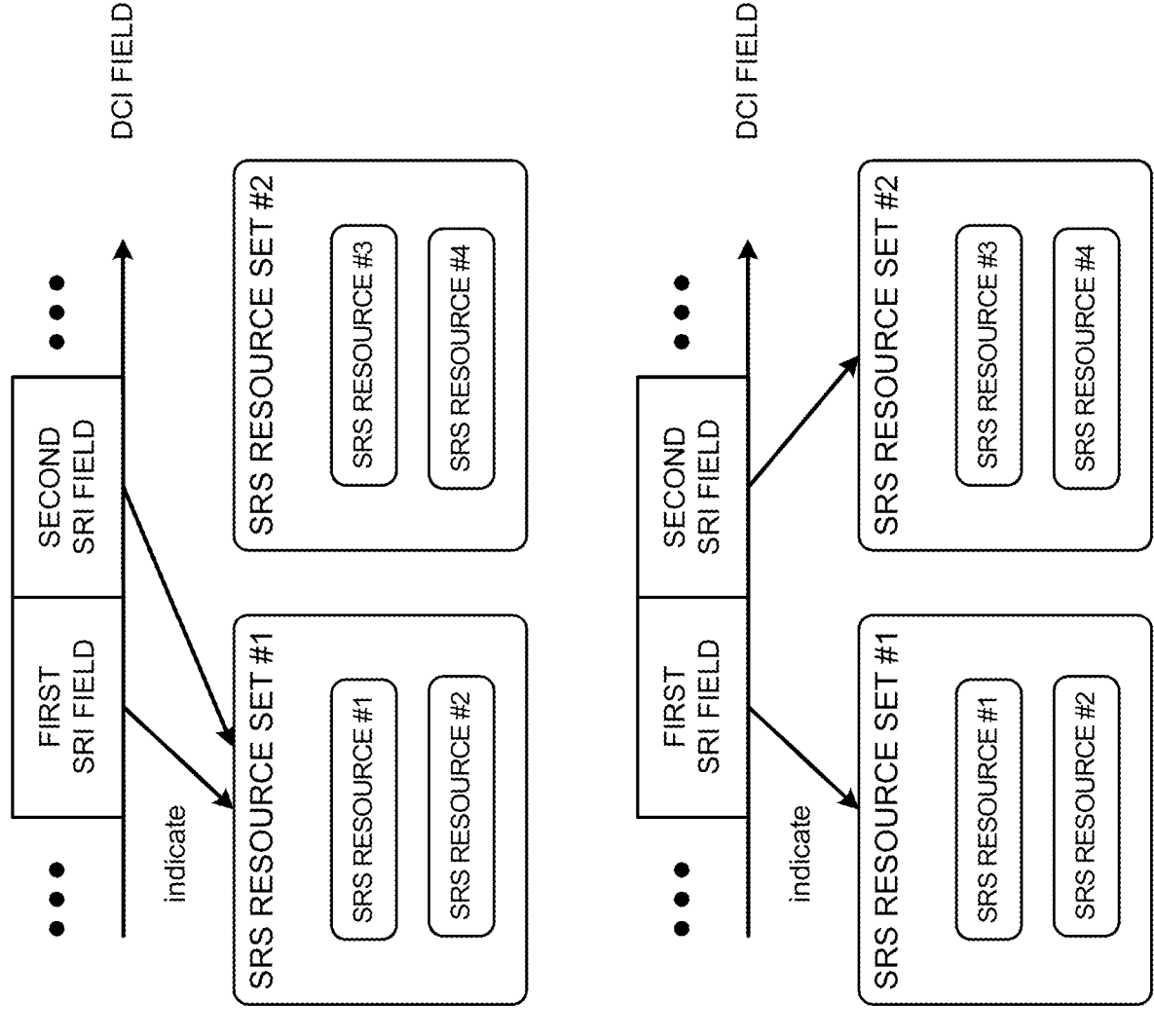
FIGS. 4A and 4B are each a diagram to show an example of specification of an SRS resource set in embodiment 1.2.

FIGS. 4A and 4B are each a diagram to show an example of specification of the SRS resource set in embodiment 1.2. In the present example, which SRS resource set out of two SRS resource sets (SRS resource set #1, SRS resource set #2) configured for the UE can be specified by a first SRI field and a second SRI field included in DCI will be described.

In FIG. 4A, the two SRI fields indicate the same SRS resource set (in the present example, SRS resource set #1). For example, when the numbers of ports for SRS resources of the two SRS resource sets are different from each other, in order to equalize the numbers of SRS ports for two TRPs, two SRI fields in DCI received by the UE may indicate the same SRS resource set. In this case, the two SRI fields may indicate SRS resources for the same UE panel.

In FIG. 4A, the two SRI fields indicate different SRS resource sets. The numbers of ports for respective UE panels/SRS resource sets may be different from each other, or may be the same.

Embodiment 1.2 is broadly classified into three embodiments below depending on the number of SRS resource sets configured for the UE and the numbers of SRS ports for the SRS resource sets:

- Embodiment 1.2.1: number of SRS resource sets configured for UE is 2. The numbers of ports for SRS resources in the same SRS resource set are the same, and the numbers of ports for SRS resources included in different SRS resource sets are also the same.
- Embodiment 1.2.2: number of SRS resource sets configured for UE is 2. The numbers of ports for SRS resources in the same SRS resource set are the same, and the numbers of ports for SRS resources included in different SRS resource sets are different from each other.
- Embodiment 1.2.3: number of SRS resource sets configured for UE is 4. The numbers of ports for SRS resources in the same SRS resource set are the same, and the numbers of ports for SRS resources included in different SRS resource sets are different from each other.

Embodiment 1.2.1

In embodiment 1.2.1, the number of SRS ports common to the SRS resource sets may be determined/configured on the basis of a UE capability, may be determined/configured on the basis of a UE panel having a minimum or maximum number of antenna ports (or the minimum or maximum number of antenna ports), or may be determined/configured on the basis of both of these.

Embodiment 1.2.2

In embodiment 1.2.2, as described in the above-mentioned embodiment 1.1, it may be assumed that one SRS resource set corresponds to one panel.

In embodiment 1.2.2, the UE may assume that each of two SRI fields included in DCI specifies both an SRS resource set and SRS resource in a manner similar to that described in embodiment 1.1.1. In this case, the UE may assume that two SRS resources specified by the two SRI fields have the same number of ports.

In embodiment 1.2.2, the UE may assume that a first SRI field out of two SRI fields included in DCI specifies both an SRS resource set and SRS resource in a manner similar to that described in embodiment 1.1.1. In this case, the UE may assume that a second SRI field indicates only an SRS resource in the SRS resource set specified by the above-described first SRI field, or may assume that the second SRI field indicates only an SRS resource having the same number of ports as that of the SRS resource specified by the above-described first SRI field.

For example, when the first SRI field indicates an SRS resource of a first SRS resource set, the UE may judge that the second SRI field indicates an SRS resource in the first SRS resource set.

In embodiment 1.2.2, one of SRS resource sets used for the MTRP PUSCH may be specified by DCI/MAC CE/RRC for the UE in a manner similar to that described in embodiment 1.1.2 to embodiment 1.1.5, or may be determined on the basis of reporting performed by the UE. The UE may assume that both of the two SRI fields specify SRS resources in the specified/reported SRS resource set, or may assume that the first SRI field specifies an SRS resource in the specified/reported SRS resource set, and the second SRI field specifies an SRS resource in an SRS resource set different from the specified/reported SRS resource set.

Embodiment 1.2.3

In embodiment 1.2.3, it may be assumed that one SRS resource set corresponds to a combination of one TRP and one panel. For example, respective four SRS resource sets may correspond to TRP 1+UE panel 1, TRP 1+UE panel 2, TRP 2+UE panel 1, and TRP 2+UE panel 2.

In embodiment 1.2.3, the UE may perform transmission of a PUSCH (PUSCH repetition, PUSCH transmission occasion) using a certain SRS resource set for a TRP corresponding to the SRS resource set by using a panel determined on the basis of the SRS resource set.

Correspondence between SRS resource sets and UE panels may be determined by specifications beforehand, or may be specified/determined by higher layer signaling, physical layer signaling, a UE capability, or a combination of these.

Note that it may be assumed that SRS resource sets corresponding to the same UE panel have the same number of SRS ports. It may be assumed that respective SRS resource sets corresponding to different UE panels have different numbers of SRS ports.

For example, first and second SRS resource sets may correspond to the same panel, and third and fourth SRS resource sets may correspond to another same panel. The first and third SRS resource sets may correspond to the same panel, and the second and fourth SRS resource sets may correspond to another same panel.

Correspondence between SRS resource sets and TRPs/SRIs (SRI fields) may be determined by specifications beforehand, or may be specified/determined by higher layer signaling, physical layer signaling, a UE capability, or a combination of these.

Each SRS field may correspond to two SRS resource sets, and the two SRS resource sets may correspond to different UE panels.

For example, a first SRI field may correspond to first and second SRS resource sets, and a second SRI field may correspond to third and fourth SRS resource sets. The first SRI field may correspond to the first and third SRS resource sets, and the second SRI field may correspond to the second and fourth SRS resource sets.

Note that the number of SRS resource sets may be greater than 4, and in that case, embodiment 1.2.3 may be interpreted on the basis of the number of panels and the number of TRPs when employed. For example, the "first and second SRS resource sets" may be interpreted as "n SRS resource sets in ascending order (for example, from the lowest ID)," and the "third and fourth SRS resource sets" may be interpreted as "n SRS resource sets in descending order (for example, from the highest ID)." The "first and third SRS resource sets" may be interpreted as "n odd-numbered SRS resource sets (or with odd-numbered (or even-numbered) IDs)," and the "third and fourth SRS resource sets" may be interpreted as "n even-numbered SRS resource sets (or with even-numbered (or odd-numbered) IDs)."

In embodiment 1.2.3, the UE may assume that each of two SRI fields included in DCI specifies both an SRS resource set and SRS resource in a manner similar to that described in embodiment 1.1.1. In this case, the UE may assume that two SRS resources specified by the two SRI fields have the same number of ports.

In embodiment 1.2.3, the UE may assume that a first SRI field out of two SRI fields included in DCI specifies both an SRS resource set and SRS resource in a manner similar to that described in embodiment 1.1.1. In this case, the UE may assume that a second SRI field indicates only an SRS resource in the SRS resource set specified by the above-described first SRI field, or may assume that the second SRI field indicates only an SRS resource having the same number of ports as that of the SRS resource specified by the above-described first SRI field.

For example, when the first SRI field indicates an SRS resource of a first SRS resource set, the UE may judge that the second SRI field indicates an SRS resource in the first SRS resource set.

In embodiment 1.2.2, one of UE panels may be specified by DCI/MAC CE/RRC for the UE in a manner similar to that of an aspect in which the "SRS resource sets" of embodiment 1.1.2 to embodiment 1.1.5 are interpreted as "UE panels," or may be determined on the basis of reporting performed by the UE. The UE may assume that both of the two SRI fields specify SRS resources in an SRS resource set corresponding to the specified/reported UE panel, or may assume that the first SRI field specifies an SRS resource in the SRS resource set corresponding to the specified/reported UE panel, and the second SRI field specifies an SRS resource in an SRS resource set corresponding to a UE panel different from the specified/reported UE panel.

For example, in a case where first and second SRS resource sets correspond to the same panel (first panel), and third and fourth SRS resource sets correspond to another same panel (second panel), when the first panel is specified for the UE, the UE may judge that the first SRI field indicates an SRS resource of the first SRS resource set corresponding to the first panel, and the second SRI field indicates an SRS resource in the second SRS resource set corresponding to the first panel.

According to the first embodiment described above, it is possible to appropriately perform control of CB-based PUSCH transmission related to a plurality of panels by using a plurality of SRS resource sets under, for example, assumption that one SRS resource set corresponds to one panel.

Second Embodiment

A second embodiment relates to SRI indication based on an assumption of a CB-based PUSCH similarly to the first embodiment.

In the second embodiment, at least two SRS resource sets are configured for a UE. SRS resources included in the same SRS resource set have the same number of ports in the first embodiment, but, in the second embodiment, may have different numbers of ports, or may have the same number of ports.

Figure 5:
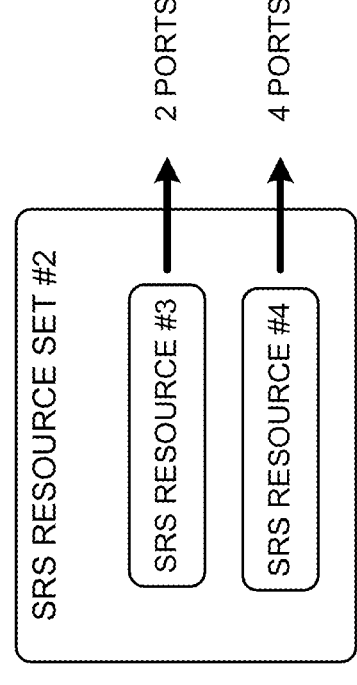
FIG. 5 is a diagram to show an example of SRS resource sets configured in a second embodiment.
Figure 5:
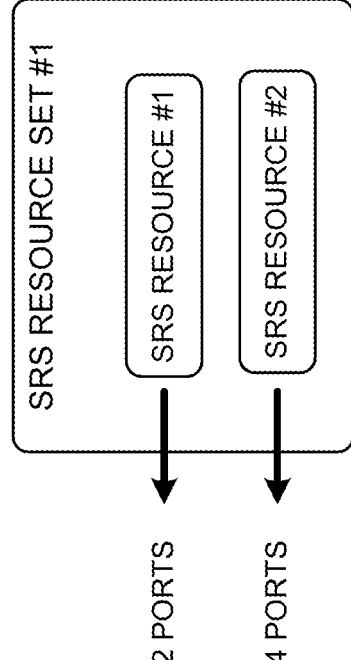

FIG. 5 is a diagram to show an example of the SRS resource sets configured in the second embodiment. In the present example, two SRS resource sets (SRS resource set #1, SRS resource set #2) are configured for the UE. SRS resource set #1 includes an SRS resource (SRS resource #1) with the number of ports=2 and an SRS resource (SRS resource #2) with the number of ports=4, and SRS resource set #2 includes an SRS resource (SRS resource #3) with the number of ports=2 and an SRS resource (SRS resource #4) with the number of ports=4.

The second embodiment is broadly classified into embodiment 2.1 regarding an STRP PUSCH and embodiment 2.2 regarding an MTRP PUSCH.

Embodiment 2.1

Embodiment 2.1 may be similar to embodiment 1.1. That is, in embodiment 2.1, as a method with which the UE identifies which SRS resource of which SRS resource set is used for STRP PUSCH transmission, any one or combinations of embodiment 1.1.1 to embodiment 1.1.5 mentioned above may be used.

Embodiment 2.2

Embodiment 2.2 may be similar to embodiment 1.2. That is, in embodiment 2.2, as a method with which the UE identifies which SRS resource of which SRS resource set is used for MTRP PUSCH transmission, any one or combinations of embodiment 1.2.1 to embodiment 1.2.3 mentioned above may be used.

In embodiment 2.2, variations below may be used together with or in place of any one or combinations of the above-mentioned embodiment 1.2.1 to embodiment 1.2.3.

Variations of Embodiment 2.2

In the variations of embodiment 2.2, two SRS resource sets are configured for the UE. The first SRI field may correspond to a first SRS resource set, and the second SRI field may correspond to a second SRS resource set.

When dynamic switching in TRP order for MTRP PUSCH transmission is specified by DCI, the UE may judge, on the basis of the specified TRP order, an SRS resource set corresponding to each SRI field. For example, when order (starting from TRP 1 to TRP 2) is specified, the UE may judge that the first SRI field corresponds to the first SRS resource set, and the second SRI field corresponds to the second SRS resource set. For example, when order (starting from TRP 2 to TRP 1) is specified, the UE may judge that the first SRI field corresponds to the second SRS resource set, and the second SRI field corresponds to the first SRS resource set.

Note that the TRP order may be order indicating which TRP/SRI field/SRS resource set is applied to each PUSCH repetition, and, for example, cyclic mapping (for example, such order as TRP 1, TRP 2, TRP 1, and TRP 2), sequential mapping (for example, such order as TRP 1, TRP 1, TRP 2, and TRP 2), half-half mapping, or the like may be specified, or explicit order may be specified as described above. When the number of TRPs in specified order is less than the number of repetitions, the order may be repetitively applied in accordance with any one of the above-described mapping.

In the variations of embodiment 2.2, the UE may expect that respective two SRI fields specify two SRS resources with the same number of ports (in other words, the UE may assume that SRS resources with different numbers of ports are not specified by the two SRI fields).

In the variations of embodiment 2.2, the UE may assume that the second SRI field indicates only an SRS resource having the same number of ports as that of an SRS resource specified by the first SRI field.

Figures 6A, 6B:
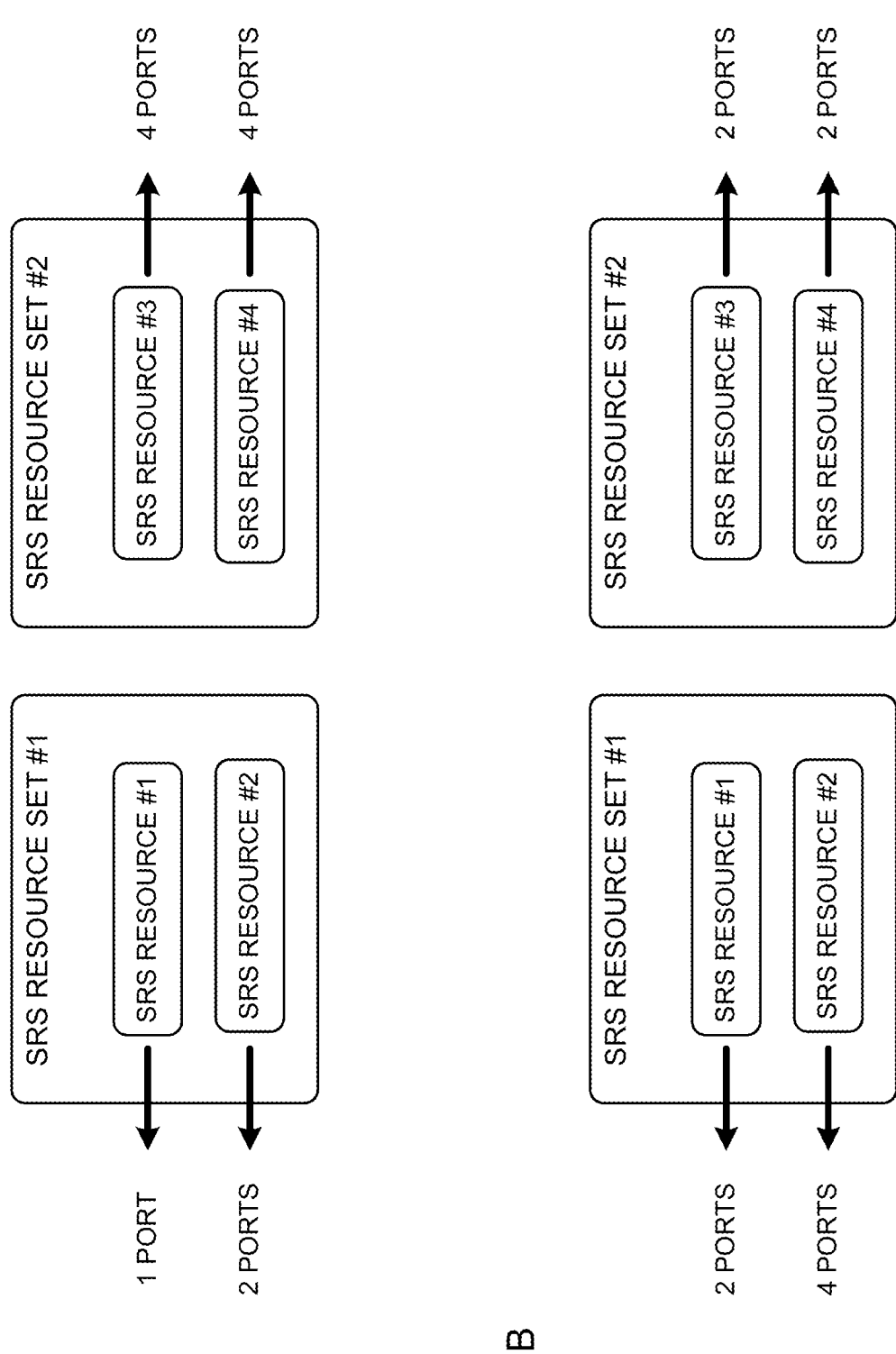
FIGS. 6A and 6B are each a diagram to show an example of SRS resource sets in variations of embodiment 2.2.

FIGS. 6A and 6B are each a diagram to show an example of the SRS resource sets in the variations of embodiment 2.2. The present example (and FIGS. 7A and 7B) is similar to FIG. 5 except that the numbers of ports for SRS resources are different from each other, and thus overlapping description will not be repeated.

In the variations of embodiment 2.2, a constraint that at least one SRS resource out of a combination of two SRS resources from each of the two SRS resource sets has the same number of ports (in other words, the number of ports for at least one SRS resource of the first SRS resource set is the same as the number of ports for at least one SRS resource of the second SRS resource set) may be applied.

Under this constraint, configuration of FIG. 6A is not allowed (because the numbers of ports=1 and 2 corresponding to SRS resources of the first SRS resource set are different from the number of ports=4 for an arbitrary SRS resource of the second SRS resource set). On the other hand, configuration of FIG. 6B is allowed (because the number of ports=2 out of the numbers of ports=2 and 4 corresponding to SRS resources of the first SRS resource set is the same as the number of ports=2 for an arbitrary SRS resource of the second SRS resource set).

Figures 7A, 7B:
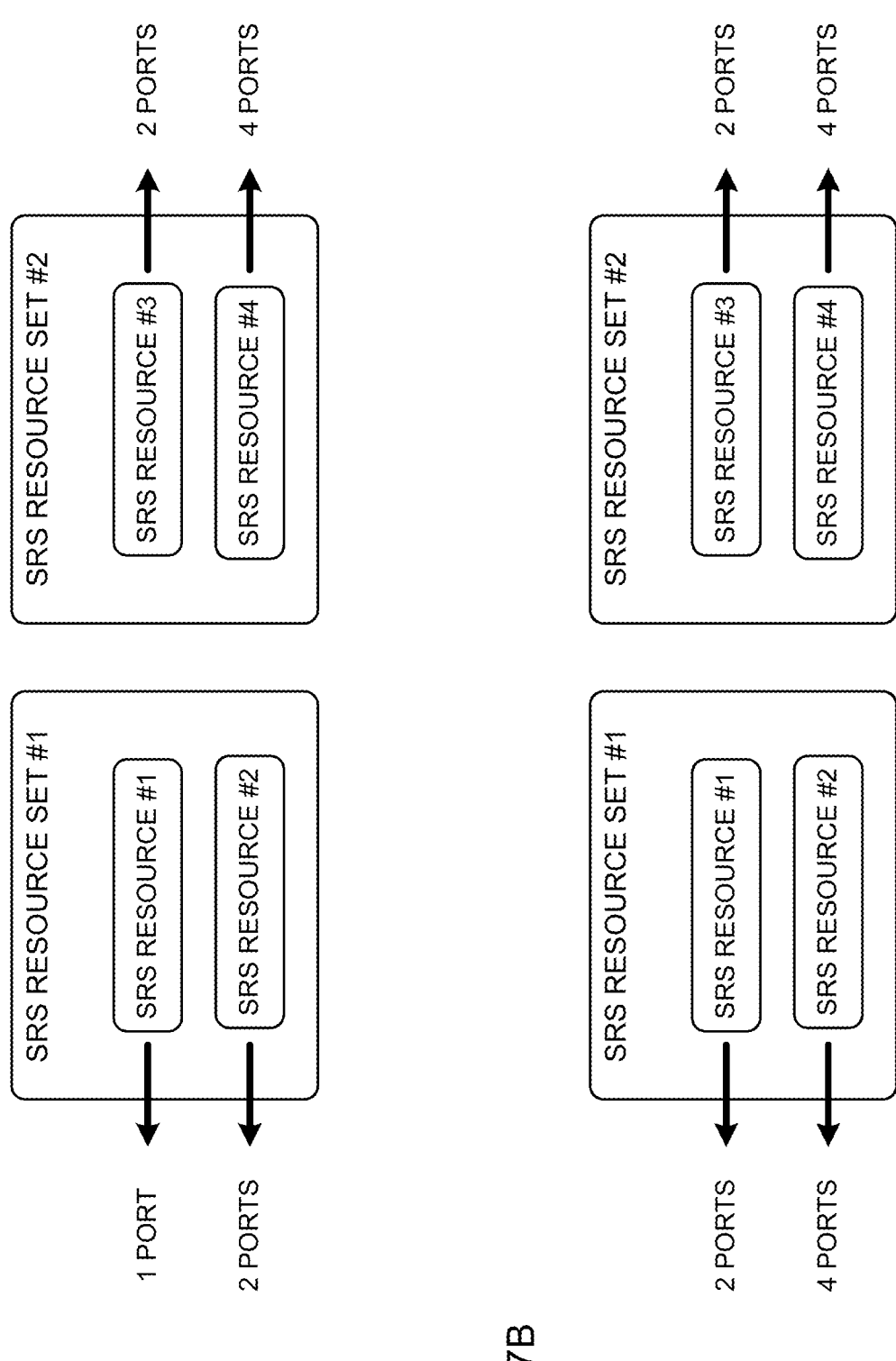
FIGS. 7A and 7B are each a diagram to show another example of the SRS resource sets in the variations of embodiment 2.2.

FIGS. 7A and 7B are each a diagram to show another example of the SRS resource sets in the variations of embodiment 2.2.

In the variations of embodiment 2.2, when the first SRS resource set has an SRS resource with the number of ports=X and an SRS resource with the number of ports=Y (X and Y are integers, for example, X $\neq$ Y), a constraint that the second SRS resource set also has an SRS resource with the number of ports=X and an SRS resource with the number of ports=Y may be applied.

Under this constraint, configuration of FIG. 7A is not allowed (because a combination of the numbers of ports=1 and 2 corresponding to SRS resources of the first SRS resource set is different from a combination of the numbers of ports=2 and 4 corresponding to SRS resources of the second SRS resource set). On the other hand, configuration of FIG. 7B is allowed (because a combination of the numbers of ports=2 and 4 corresponding to SRS resources of the first SRS resource set is the same as a combination of the numbers of ports=2 and 4 corresponding to SRS resources of the second SRS resource set). Note that in FIG. 7B, for example, a case where the number of ports for SRS resource #3=4 and the number of ports for SRS resource #4=2 may also be allowed.

According to the second embodiment described above, it is possible to appropriately perform control of CB-based PUSCH transmission related to a plurality of panels by using a plurality of SRS resource sets under, for example, assumption that one SRS resource set corresponds to one panel.

Third Embodiment

A third embodiment relates to SRI indication based on an assumption of an NCB-based PUSCH.

In the third embodiment, at least two SRS resource sets are configured for a UE. The number of included SRS resources may vary for each SRS resource set.

Figure 8:
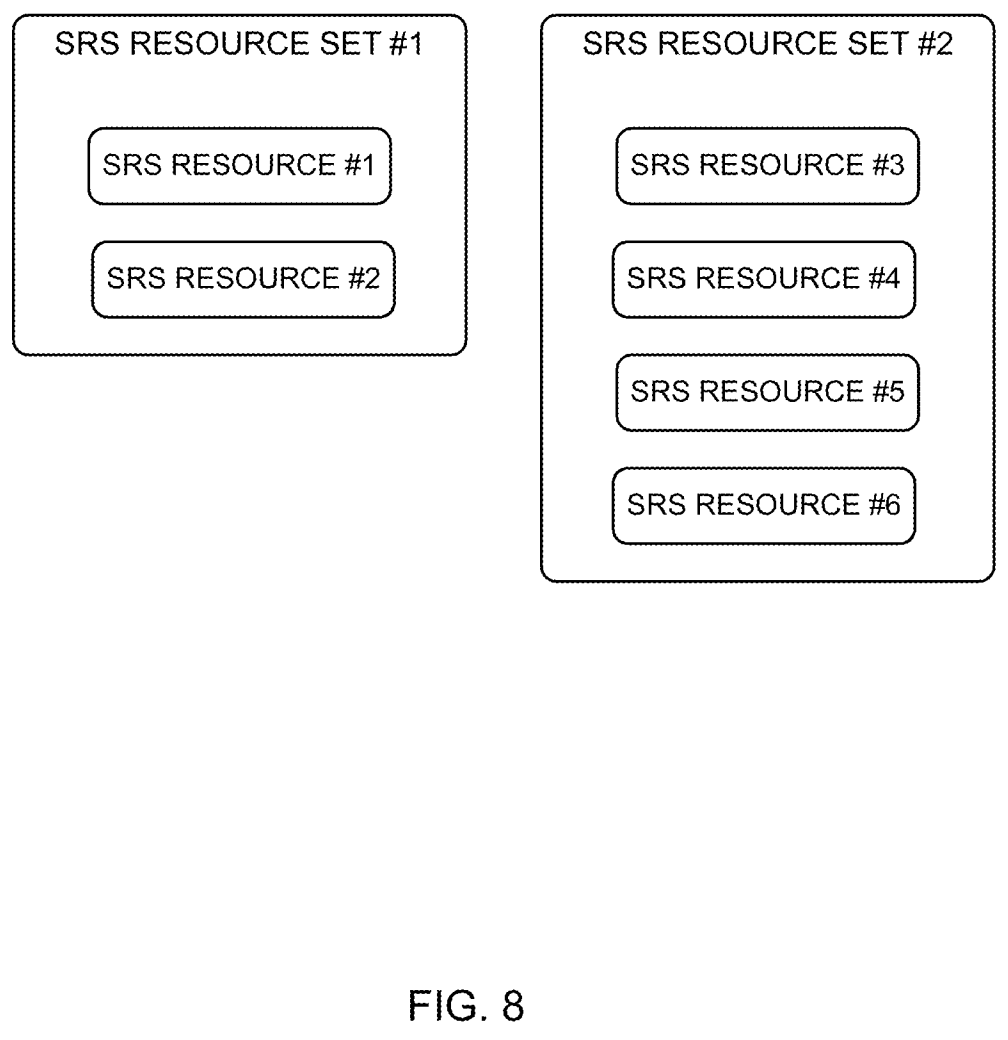

FIG. 8 is a diagram to show an example of the SRS resource sets configured in the third embodiment. In the present example, two SRS resource sets (SRS resource set #1, SRS resource set #2) are configured for the UE. SRS resource set #1 includes two SRS resources (SRS resource #1, SRS resource #2), and SRS resource set #2 includes four SRS resources (SRS resource #3, SRS resource #4, SRS resource #5, SRS resource #6).

The third embodiment is broadly classified into embodiment 3.1 regarding an STRP PUSCH and embodiment 3.2 regarding an MTRP PUSCH.

Embodiment 3.1

Embodiment 3.1 may be similar to embodiment 1.1. That is, in embodiment 3.1, as a method with which the UE identifies which SRS resource of which SRS resource set is used for STRP PUSCH transmission, any one or combinations of embodiment 1.1.1 to embodiment 1.1.5 mentioned above may be used. Note that "SRS resources" in these embodiments may be interpreted as "SRS resources or combinations of SRS resources."

For example, in embodiment 3.1.1 similar to embodiment 1.1.1, the UE determines both an SRS resource set and SRS resource on the basis of one SRI field.

FIG. 9 is a diagram to show an example of correspondence between an SRI field value, and an SRS resource set and SRS resource in embodiment 3.1.1. The present example relates to SRI indication for non-codebook-based PUSCH transmission in a case where $L_{max}$=2. Note that a value of $L_{max}$ may be configured by a higher layer parameter "maxMIMO-Layers" indicating a maximum number of MIMO (Multi Input Multi Output) layers, or may be given by a maximum number of layers for a PUSCH supported by the UE.

In the present example, respective SRI codepoints 0 to x (x is an integer, x=2 in FIG. 9) correspond to an SRS resource from a first SRS resource set (for example, an SRS resource corresponding to SRI #0 or SRI #1), or a combination of SRS resources (for example, a combination of two SRS resources corresponding to SRI #{0, 1}). Respective SRI codepoints x+1 to x+1+y (y is an integer, y>4 in FIG. 9) correspond to an SRS resource from a second SRS resource set (for example, an SRS resource corresponding to SRI #0, SRI #1, SRI #2, or SRI #3), or a combination of SRS resources (for example, a combination of two SRS resources corresponding to SRI #{0, 1}).

According to embodiment 3.1 described above, it is possible to appropriately perform control of PUSCH transmission related to a plurality of panels by using a plurality of SRS resource sets under, for example, assumption that one SRS resource set corresponds to one panel.

Embodiment 3.2

Embodiment 3.2 may be similar to embodiment 1.2/2.2 (including the variations of embodiment 2.2). That is, in embodiment 3.2, as a method with which the UE identifies which SRS resource of which SRS resource set is used for MTRP PUSCH transmission, any one or combinations of methods of embodiment 1.2/embodiment 2.2 (including the variations of embodiment 2.2) mentioned above may be used.

Note that in embodiment 3.2, the UE may expect that two respective SRI fields specify the same number of (combinations of) SRS resources. In other words, the UE may assume that the second SRI field indicates only the same number of (combinations of) SRS resources as the number of (combinations of) SRS resources specified by the above-described first SRI field.

For example, when a value of the first SRI field indicates a combination of two SRS resources of the first SRS resource set, a value of the second SRI field may indicate a combination of two SRS resources of the second SRS resource set.

According to the third embodiment described above, it is possible to appropriately perform control of NCB-based PUSCH transmission related to a plurality of panels by using a plurality of SRS resource sets under, for example, assumption that one SRS resource set corresponds to one panel.

<Others>

Note that at least one of the above-mentioned embodiments may be employed only in a UE that has reported a specific UE capability or that supports the specific UE capability.

The specific UE capability may indicate at least one of the following:

Whether to support (operation of) plurality of UE panels

Whether to support different SRS resources having different numbers of SRS ports in different SRS resource sets Whether to support different SRS resources having different numbers of SRS ports in same SRS resource set Whether to support PUSCH/PUSCH repetition for multiple TRPs Whether to support PUSCH/PUSCH repetition for multiple TRPs and (operation of) plurality of UE panels Note that the above-described specific UE capability may be a capability for a CB-based PUSCH, may be a capability for an NCB-based PUSCH, or may be a capability without distinction between these PUSCHs.

At least one of the above-mentioned embodiments may be employed in a case where specific information related to the above-mentioned embodiments has been configured for the UE by higher layer signaling (otherwise, for example, operation for Rel. 15/16 is employed). For example, the specific information may be information indicating enabling of PUSCH repetition for multiple TRPs, information indicating enabling of (operation of) a plurality of UE panels, configuration information about a plurality of SRS resource sets for specific usage (for example, CB/NCB), an arbitrary RRC parameter for specific release (for example, Rel. 17), or the like. Which of embodiments/cases/conditions mentioned above PHR control is performed on the basis of may be configured for the UE by using a higher layer parameter.

Note that the above-mentioned embodiments may be employed in a case where PUSCH repetition type A/type B is used.

Note that the above-mentioned embodiments may be employed in a case where a specific (cyclical, sequential, half-half, or the like) mapping pattern for MTRP repetition is used.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
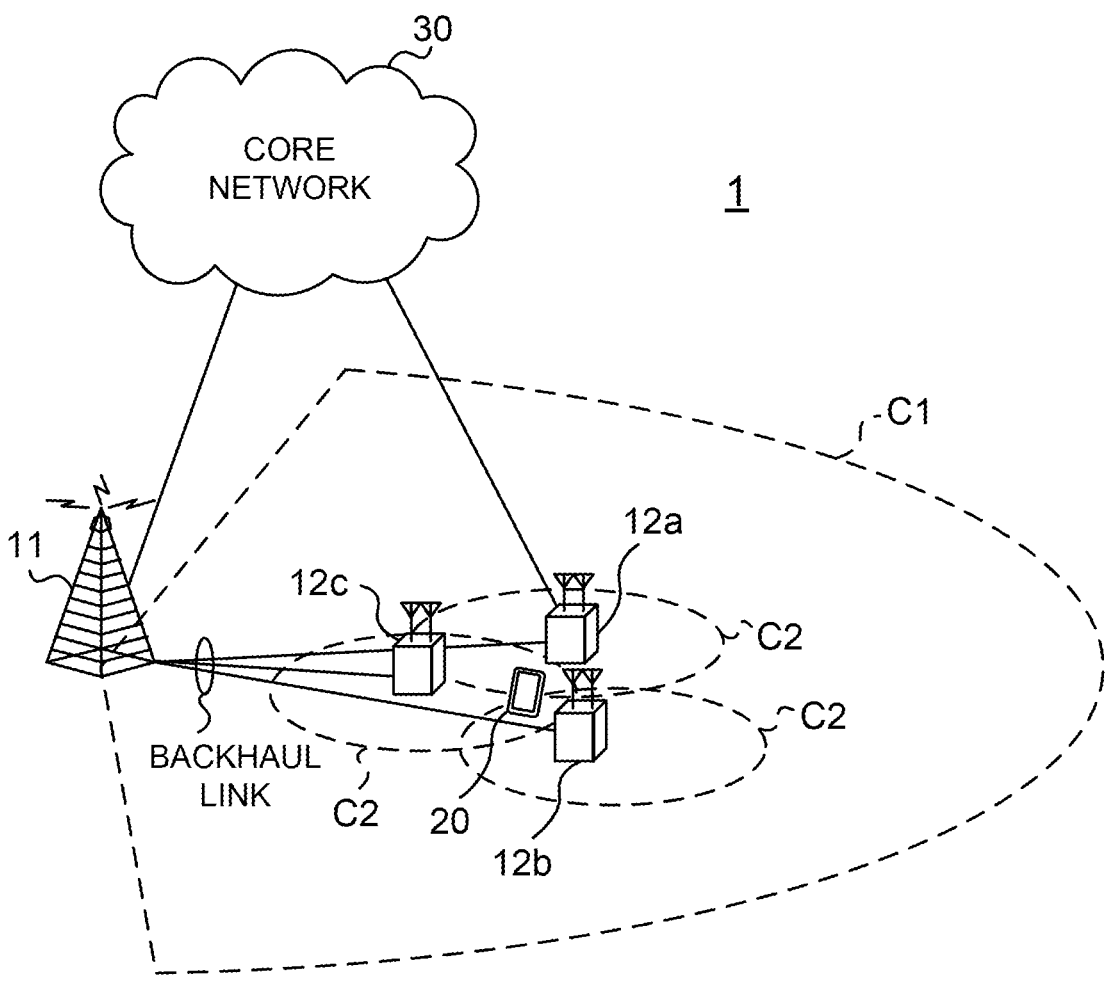
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
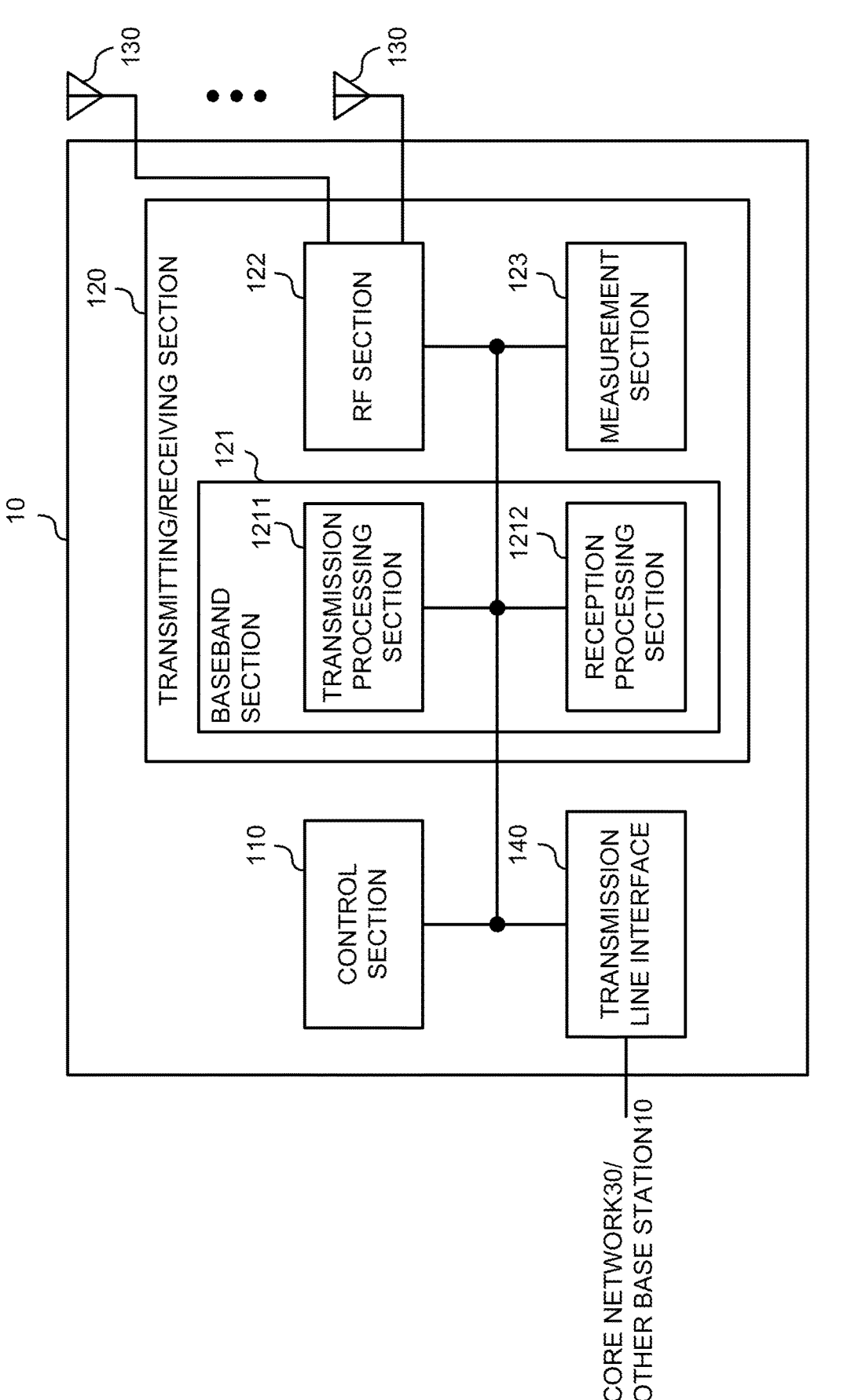
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit, to the user terminal 20, downlink control information (DCI/S-DCI) including a first sounding reference signal (SRS) resource indicator (SRI) field and a second SRI field.

The transmitting/receiving section 120 may receive codebook-based or non-codebook-based uplink transmission (for example, a PUSCH) scheduled by the downlink control information, the codebook-based or non-codebook-based uplink transmission being transmitted by the terminal by using a first panel determined on the basis of the first SRI field and a second panel determined on the basis of the second SRI field.

(User Terminal)

Figure 12:
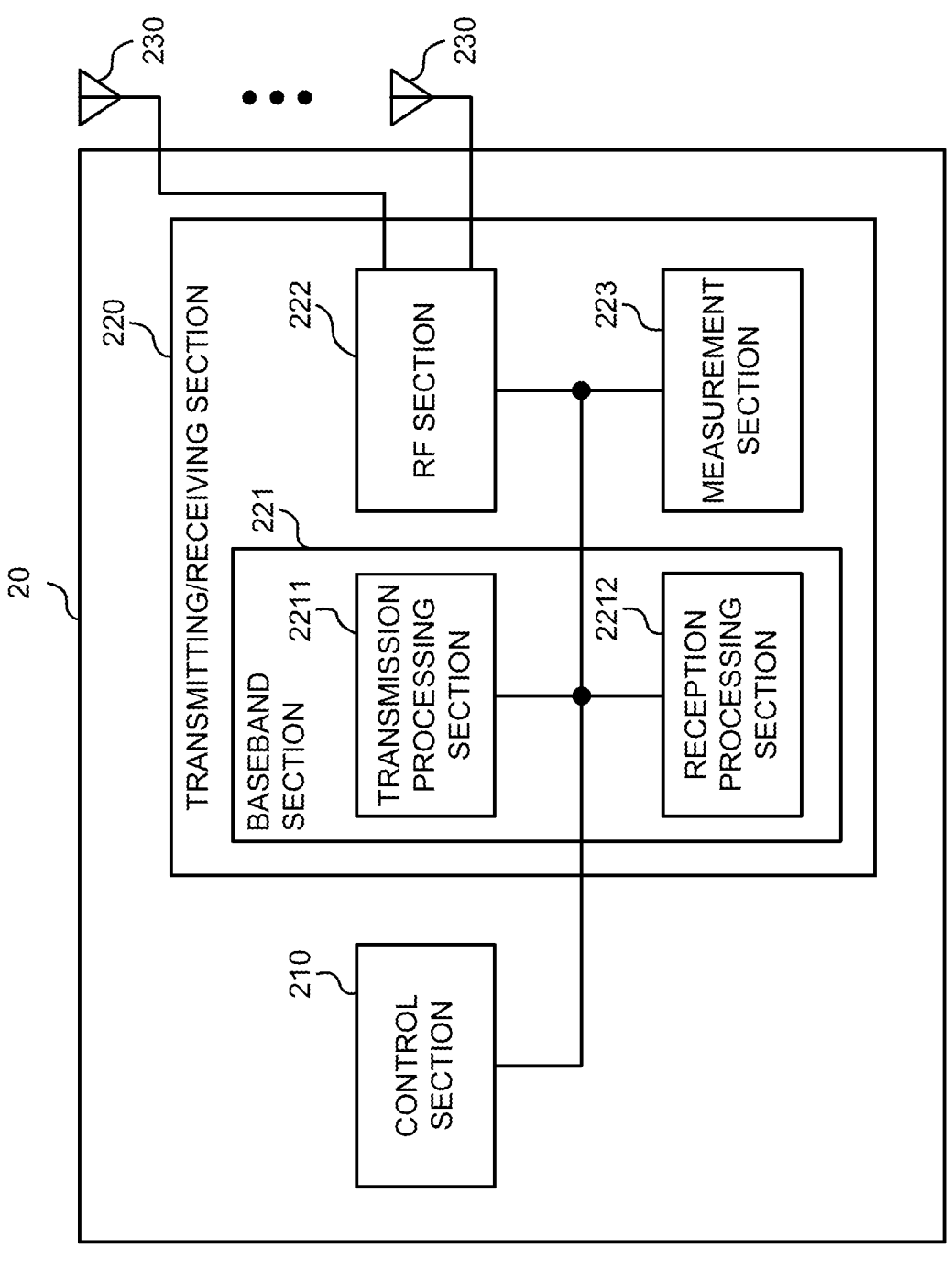
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive downlink control information (DCI) including a first sounding reference signal (SRS) resource indicator (SRI) field and a second SRI field.

The control section 210 may perform control to perform codebook-based or non-codebook-based uplink transmission (for example, a CB/NCB PUSCH for STRP/MTRP) scheduled by the downlink control information by using a first panel determined on the basis of the first SRI field and a second panel determined on the basis of the second SRI field.

The control section 210 may determine the first panel on the basis of a first SRS resource set corresponding to an SRS resource specified by the first SRI field.

The control section 210 may assume that the second SRI field indicates an SRS resource in the first SRS resource set.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
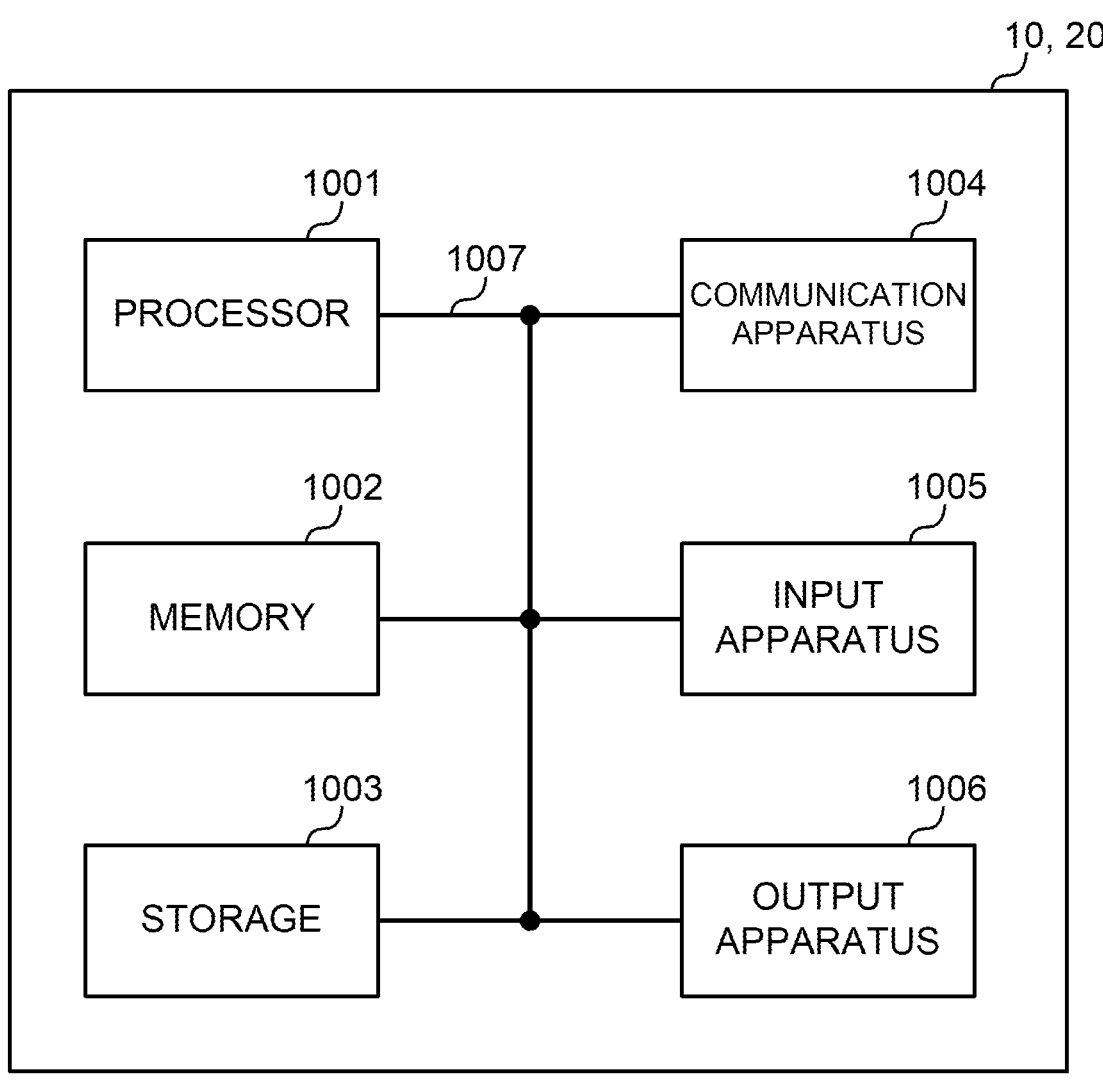
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

This application is based on Japanese Patent Application No. 2021-86492 filed on May 21, 2021. The entire contents of the application are herein incorporated.

What is claimed is:

1. A terminal comprising:
a receiver that receives downlink control information for scheduling a non-codebook based uplink shared channel to be transmitted with a number of repetitions, the downlink control information including a first sounding reference signal (SRS) resource indicator (SRI) field and a second SRI field and explicitly indicating an order of SRS resource sets that are applied to respective transmissions of the uplink shared channel; and
a processor that determines the SRS resource sets applied to the respective transmissions of the uplink shared channel, based on the order, from a first SRS resource set corresponding to the first SRI field and a second SRS resource set corresponding to the second SRI field, and controls to transmit the uplink shared channel,
wherein when a number of SRS resource sets in the order is less than the number of repetitions, the processor repeatedly applies the SRS resource sets in the order to the respective transmissions of the uplink shared channel.

2. The terminal according to claim 1, wherein the processor expects that the first SRI field and the second SRI field indicate SRS resources with a same number of ports.

3. The terminal according to claim 2, wherein the processor controls to perform a transmission to which the first SRS resource set is applied, using a first panel and to perform a transmission to which the second SRS resource set is applied, using a second panel.

4. The terminal according to claim 1, wherein the second SRI field indicates only a same number of SRS resources as a number of SRS resources indicated by the first SRI field.

5. The terminal according to claim 4, wherein the processor controls to perform a transmission to which the first SRS resource set is applied, using a first panel and to perform a transmission to which the second SRS resource set is applied, using a second panel.

6. The terminal according to claim 1, wherein the processor controls to perform a transmission to which the first SRS resource set is applied, using a first panel and to perform a transmission to which the second SRS resource set is applied, using a second panel.

7. A radio communication method for a terminal, comprising:
receiving downlink control information for scheduling a non-codebook based uplink shared channel to be transmitted with a number of repetitions, the downlink control information including a first sounding reference signal (SRS) resource indicator (SRI) field and a second SRI field and explicitly indicating an order of SRS resource sets that are applied to respective transmissions of the uplink shared channel; and
determining the SRS resource sets applied to the respective transmissions of the uplink shared channel, based on the order, from a first SRS resource set corresponding to the first SRI field and a second SRS resource set corresponding to the second SRI field, and controlling to transmit the uplink shared channel,
wherein when a number of SRS resource sets in the order is less than the number of repetitions, repeatedly applying the SRS resource sets in the order to the respective transmissions of the uplink shared channel.

8. A base station comprising:
a transmitter that transmits, to a terminal, downlink control information for scheduling a non-codebook based uplink shared channel to be transmitted with a number of repetitions, the downlink control information including a first sounding reference signal (SRS) resource indicator (SRI) field and a second SRI field and explicitly indicating an order of SRS resource sets that are applied to respective transmissions of the uplink shared channel; and
a receiver that receives the uplink shared channel, wherein the terminal determines the SRS resource sets applied to the respective transmissions of the uplink shared channel, based on the order, from a first SRS resource set corresponding to the first SRI field and a second SRS resource set corresponding to the second SRI field and transmits the uplink shared channel,
wherein when a number of SRS resource sets in the order is less than the number of repetitions, the terminal repeatedly applies the SRS resource sets in the order to the respective transmissions of the uplink shared channel.

9. A system comprising:
a terminal; and
a base station:
wherein the terminal includes:
a receiver that receives downlink control information for scheduling a non-codebook based uplink shared channel to be transmitted with a number of repetitions, the downlink control information including a first sounding reference signal (SRS) resource indicator (SRI) field and a second SRI field and explicitly indicating an order of SRS resource sets that are applied to respective transmissions of the uplink shared channel; and
a processor that determines the SRS resource sets applied to the respective transmissions of the uplink shared channel, based on the order, from a first SRS resource set corresponding to the first SRI field and a second SRS resource set corresponding to the second SRI field, and controls to transmit the uplink shared channel,
wherein when a number of SRS resource sets in the order is less than the number of repetitions, the processor repeatedly applies the SRS resource sets in the order to the respective transmissions of the uplink shared channel, and
wherein the base station includes:
a transmitter that transmits, to the terminal, the downlink control information; and
a receiver that receives the uplink shared channel.

* * * * *